(12) United States Patent
Liang et al.

(10) Patent No.: US 9,542,373 B2
(45) Date of Patent: Jan. 10, 2017

(54) METHOD AND APPARATUS FOR COMPRESSING WEBPAGE TEXT

(71) Applicant: GUANGZHOU UCWEB COMPUTER TECHNOLOGY CO., LTD, Guangzhou (CN)

(72) Inventors: Jie Liang, Guangzhou (CN); Xiaopeng He, Guangzhou (CN); Yongfu Yu, Guangzhou (CN); Shunyan Zhu, Guangzhhou (CN); Xing Yang, Guangzhou (CN)

(73) Assignee: GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 162 days.

(21) Appl. No.: 14/388,529

(22) PCT Filed: Sep. 4, 2013

(86) PCT No.: PCT/CN2013/082950
§ 371 (c)(1),
(2) Date: Sep. 26, 2014

(87) PCT Pub. No.: WO2014/101462
PCT Pub. Date: Jul. 3, 2014

(65) Prior Publication Data
US 2015/0058715 A1 Feb. 26, 2015

(30) Foreign Application Priority Data

Dec. 31, 2012 (CN) .......................... 2012 1 0593915

(51) Int. Cl.
*G06F 17/00* (2006.01)
*G06F 17/22* (2006.01)
*G06F 17/27* (2006.01)

(52) U.S. Cl.
CPC ....... *G06F 17/2252* (2013.01); *G06F 17/2217* (2013.01); *G06F 17/272* (2013.01)

(58) Field of Classification Search
CPC .................................................. G06F 17/2217
See application file for complete search history.

(56) References Cited

U.S. PATENT DOCUMENTS 8,077,061 B2 * 12/2011 Cameron ............ G06F 17/2217
341/50
9,223,758 B1 * 12/2015 Oikawa ............... G06F 17/2217
(Continued)

FOREIGN PATENT DOCUMENTS

CN 102479075 A 5/2012
CN 102508824 A 6/2012
(Continued)

OTHER PUBLICATIONS

Zilles, "Accordion Arrays: Selective Compression of Unicode Arrays in Java" ISMM'07, Oct. 21-22, 2007, Montreal, Quebec, Canada, Copyright 2007 ACM, p. 55-66.*

*Primary Examiner* — Amelia Tapp
(74) *Attorney, Agent, or Firm* — Anova Law Group, PLLC

(57) ABSTRACT

Methods and apparatus for compressing webpage text are provided. According to a webpage-opening request of a mobile terminal browser, a current language environment of the terminal is obtained. According to the language environment, a character container corresponding to the language environment is initialized. Requested webpage data are received. The received webpage data are parsed. The webpage data are merged and stored using the corresponding character container. During the initializing of the corresponding character container according to the language environment, it is determined whether the language environment belongs to Latin languages. When the language (Continued)

environment belongs to Latin languages, the character container is initialized to store utf-8 encoded data. Otherwise, the character container is initialized to store utf-16 encoded data. The present disclosure can intelligently determine a storage method according to the language environment, optimize and adapt stored content, and effectively reduce the browser memory occupied by the webpage data.

12 Claims, 2 Drawing Sheets

(56) References Cited

U.S. PATENT DOCUMENTS

| | | | | |
|---|---|---|---|---|
| 2006/0047499 | A1* | 3/2006 | Chen et al. | G06F 17/2217 704/8 |
| 2008/0294796 | A1* | 11/2008 | Lee et al. | G06F 17/30887 709/245 |
| 2009/0199085 | A1* | 8/2009 | Park | G06F 17/2217 715/234 |
| 2011/0040735 | A1 | 2/2011 | Lee et al. | |

FOREIGN PATENT DOCUMENTS

| | | |
|---|---|---|
| CN | 102567294 A | 7/2012 |
| CN | 103077159 A | 5/2013 |

* cited by examiner

METHOD AND APPARATUS FOR COMPRESSING WEBPAGE TEXT

CROSS-REFERENCES TO RELATED APPLICATIONS

This application is a national stage of PCT Patent Application PCT/CN2013/082950, filed on Sep. 4, 2013, which claims the priority of Chinese Patent Application No. 201210593915.9, filed on Dec. 31, 2012, the entire contents of all of which are incorporated herein by reference.

FIELD OF THE DISCLOSURE

The present disclosure relates to the field of webpage browsing technology of mobile Internet and, more particularly, relates to methods and apparatus for compressing webpage text.

BACKGROUND

The most important encoding of a webpage is the encoding that is used when the webpage file is stored. If the webpage file is a static HTML (HyperText Markup Language) file, a web server directly sends the webpage file to a browser of a client, i.e., a client browser. If the webpage file is a dynamically-generated HTML file, the web server can generate corresponding encoded data according to the encoding that is stored in a dynamic script file, and such data become an HTML file to be sent to the client browser.

Due to features of a webpage file itself and characteristics of different methods for encoding, if different methods for encoding are used for storing the same webpage file, bytes that are occupied are likely to be different. For example, in a PHP (Hypertext Preprocessor) script stored as GBK (i.e., "Guojia Biaozhun Kuozhan" in Chinese, meaning 'national standard Extension') encoding, when echo 我爱你 (i.e., Chinese characters meaning 'I love you') is used, six bytes of data 'GE D2 B0 AE C4 E3' are generated. The six bytes of data are the GBK encoding of '我爱你'. However, in a PHP script stored as utf-8 encoding ('utf' stands for 'UCS Transformation Format' or 'Universal Character Set Transformation Format'), when echo '我爱你' is executed, nine bytes of data 'E6 88 91 E7 88 B1 E4 BD A0' are generated. The nine bytes of data are the utf-8 encoding of '我爱你'.

For an end user, encoding of an HTML file transmitted over from server-side is determined mainly by the encoding for storage of the HTML files or script files at server-side. The encoding that is used when a browser submits user data depends only on the encoding currently used by the browser during the viewing of a webpage, and does not have any relationship with the encoding of the HTML webpage's own file.

In existing technology, a fixed encoding method is usually used for processing during the browsing of a webpage via a mobile phone browser (or mobile browser). A user can only passively use a predetermined encoding method to process all of the webpage data, and are not able to intelligently choose an appropriate encoding method. Thus, there can often be a situation of "overkill" or "putting fine timber to petty use". As a result, a mobile browser occupies relatively significant amount of memory, and wastes the memory of the mobile phone. For the type of mobile terminals having limited hardware conditions, such as a mobile phone, the limited memory often cannot tolerate such waste. Such fixed encoding method that "blindly" occupies memory can significantly affect user experience. The problems of such situations are especially obvious on low-end mobile phones. Very often, when the user opens 1-2 windows, a memory explosion may occur and the webpage(s) may not be opened. User experience is thus seriously affected.

BRIEF SUMMARY OF THE DISCLOSURE

In view of the above problems, the present disclosure provides a method and apparatus for compressing webpage text. The disclosed method and apparatus are able to select an appropriate encoding method for storing a webpage, in order to save memory on a terminal.

One aspect of the present disclosure includes a method for compressing webpage text. The method can include the following. According to a webpage-opening request of a mobile terminal browser, a current language environment of a terminal can be obtained. According to the language environment, a character container corresponding to the language environment can be initialized. Webpage data that are requested can be received. The webpage data can be parsed. The webpage data can be merged and stored by using the corresponding character container. During the initializing of the character container corresponding to the language environment according to the language environment, the method can further include the following. It can be determined whether the language environment belongs to Latin languages. When the language environment belongs to Latin languages, the character container can be initialized to store utf-8 encoded data. When the language environment does not belong to Latin languages, the character container can be initialized to store utf-16 encoded data.

Further, during the parsing and the storing of the webpage data using the corresponding character container, the method can further include performing an adapting process and content optimization on the webpage data. The adapting process and content optimization on the webpage data can include the following. Fragmented and separated text objects in source code of the webpage data can be merged, connected end to end, and stored in the character container. An adapting index can be added for the character container, such that a corresponding text object can be adapted from the character container according to an index value.

Further, the language environment belonging to Latin languages can include English, German, or French.

Further, the character container can be a storage space for storing related webpage data, and can be implemented by applying for a "type" in software code to store the webpage data.

Further, during a process of applying for the "type" in software code to store the webpage data, an extra space can be first applied for in order to store a head of the type for indicating additional descriptive information, and an actual space can next be applied for in order to store the webpage data.

Another aspect of the present disclosure includes an apparatus for compressing webpage text. The apparatus can include a language-environment-determining unit configured to, according to a webpage-opening request of a mobile terminal browser, obtain a current language environment of a terminal. The apparatus can include a character-container-initializing unit configured to, according to the language environment, initialize a character container corresponding to the language environment. Further, the apparatus can include a data-transmitting unit configured to receive webpage data that are requested. Still further, the apparatus can include a data-parsing-storing unit configured to parse the received webpage data, and merge and store the webpage data by using the corresponding character container. The character-container-initializing unit can include a determining unit configured to determine whether the language environment belongs to Latin languages. When the language environment belongs to Latin languages, the character-container-initializing unit can initialize the character container to store utf-8 encoded data. When the language environment does not belong to Latin languages, the character-container-initializing unit can initialize the character container to store utf-16 encoded data.

Further, the data-parsing-storing unit can include a content-optimized-storage unit configured to merge fragmented and separated text objects in source code of the webpage data, connect the text objects end to end, and store the text objects in the character container. The data-parsing-storing unit can further include an adapting unit configured to add an adapting index for the character container, such that a corresponding text object is adapted from the character container according to an index value.

Further, the character container is a storage space for storing related webpage data, and is implemented by applying for a "type" in software code to store the webpage data.

Further, during a process of applying for the "type" in software code to store the webpage data, an extra space can be applied for first, in order to store a head of the type for indicating additional descriptive information. An actual space can be applied for next, in order to store the webpage data.

Further, the language environment belonging to Latin languages can include English, German, or French.

Another aspect of the present disclosure includes a non-transitory computer-readable storage medium. The non-transitory computer-readable storage medium has a program stored thereon, the program being used for executing the disclosed method for compressing webpage text.

In the present disclosure, a webpage can be stored by intelligently switching encoding method. A webpage using Latin languages (e.g., English) can be stored using utf-8 encoding. A webpage using non-Latin languages, e.g., a webpage in Chinese, can be stored using utf-16 encoding. Thus, different encodings can be used for webpage in different languages, i.e., "tailored" or "customized". On a mobile terminal having limited hardware conditions, especially certain low-end mobile phones, the very limited memory can be well utilized. A user can thus be able to open more windows. User experience can be greatly improved.

To achieve the foregoing and related purposes, one or more aspects of the present disclosure include features that are described later in detail and particularly pointed out in the claims. The following description and drawings illustrate certain exemplary aspects of the present disclosure in detail. However, these aspects merely indicate some modes of the various modes in which principles of the present disclosure may be used. Further, the present disclosure is intended to include all such aspects and equivalents thereof.

BRIEF DESCRIPTION OF THE DRAWINGS

The drawings, as a part of this application, are used for providing further understanding of the present disclosure. The exemplary embodiments of the present disclosure and description thereof are used for explaining the present disclosure and do not constitute undue limitation for the present disclosure. In the drawings.

In the drawings, the same reference number indicates similar or corresponding features or functions.

DETAILED DESCRIPTION

Figure 1:
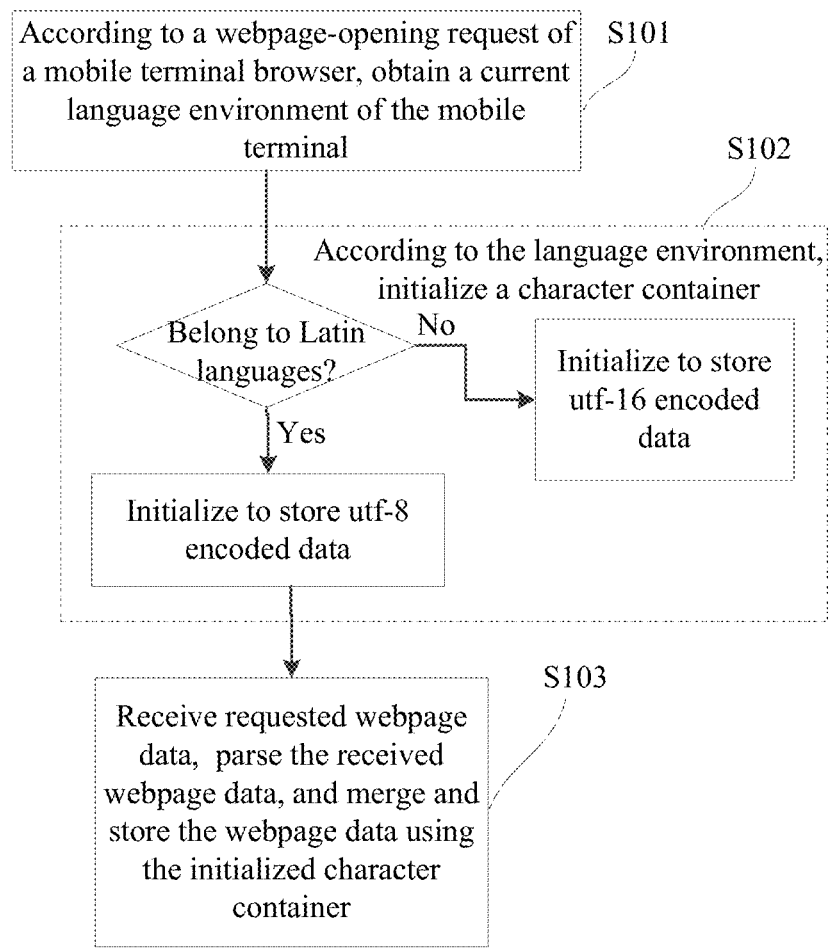
FIG. 1 depicts a flow diagram of an exemplary method for compressing webpage text in accordance with various disclosed embodiments.

It is to be noted that, in the case of no conflict, various embodiments and features in the various embodiments in the present disclosure can be combined with each other. Reference are now made in detail to exemplary embodiments of the disclosure, which are illustrated in the accompanying drawings.

In the following description, for illustrative purposes, in order to provide a thorough understanding of one or more embodiments, numerous specific details are set forth. However, those embodiments can be realized without those specific details. In other examples, in order to ease the description of one or more embodiments, well-known structures and devices can be shown in the form of block diagrams.

Because currently the main carrier of mobile Internet is mobile phone, in the following description of specific embodiments of the present disclosure, the terms "mobile terminal" and "mobile phone" can both refer to a target carrier used by a user for accessing the mobile Internet. Meanwhile, a "mobile phone" can be understood one, but not the only one, specific form of a "mobile terminal". In the following exemplary illustration of methods and apparatus for compressing webpage text provided by various embodiments, a mobile phone is used as an example.

In order to solve the problem in existing technology where mobile phone memory can be wasted because a fixed encoding method is used for storing a webpage, various disclosed embodiments propose a method for compressing webpage text. In the method according to various embodiments, the encoding method for storing webpage content can be determined according to a language environment. According to the language environment, the encoding for storing the webpage content can be determined. Thus, an appropriate encoding method can be used, to the greatest extent, for storing the webpage, in order to save mobile phone memory.

From the perspective of usual mobile phone application, the language used on a user's mobile phone can be is closely related to the location of the user. If the location of the user is in a European or American country or region, Latin (also known as Indo-European) languages including, e.g., English, German, French, and/or the like, are generally used on mobile phones. The languages used in Asia are classified as non-Latin languages in the present disclosure. For example, the language used on mobile phones of users in China is generally Chinese. The languages used on mobile phones of users in Japan and Korea are generally Japanese and Korean, respectively.

According to the feature that mobile phones use different languages, in various embodiments of the present disclosure, different encoding methods can be used for storing webpage content. According to the language environment of a mobile phone, storage method can be intelligently determined, in order to optimize the memory usage of a mobile browser. In addition, in order to ease description, in the following description of various embodiments, English of Latin languages and Chinese of non-Latin languages are used as examples, in order to illustrate the technical solution of using different webpage text compression strategies according to different language environments in accordance with various embodiments. It is to be noted that, the technical solution of webpage text compression strategies in accordance with various embodiments can be not only applicable to English and Chinese, but also applicable to other Latin languages and non-Latin languages.

FIG. 1 depicts a flow diagram of an exemplary method for compressing webpage text in accordance with various disclosed embodiments. As shown in FIG. 1, the method can include the follow exemplary steps.

In Step S101, a mobile browser obtains a current language environment via a webpage-opening request of a user.

For example, the current language environment can be determined according to a country where the website is located or other indicator(s) that describe language(s).

In one embodiment, during initialization of the mobile browser, the mobile browser can requires the user select a language. The mobile browser can then determine the current language environment according to the language selected by the user.

In Step S102, a character container is initialized according to the language environment.

In various embodiments, a "character container" refers to a storage space for storing related webpage data. During actual implementation, a "type" can be applied for in software code in order to store the webpage data. For example, in Java language, by applying for a String type, webpage data including, e.g., webpage text such as "导航" (i.e., Chinese characters meaning "navigation"), can be stored, In one embodiment, a certain extra space can first be applied for, in order to store head (i.e., some additional descriptive information) of the type. Next, an actual space can be applied for to store the webpage text. An empty character container containing no text may need to occupy a certain space, e.g., a space of 4 bytes.

For example, in this step, after obtaining the current language environment, the mobile browser determines whether the language environment is a Latin language (e.g., English). When it is determined that the language environment is a Latin languages, the character container can be initialized to store utf-8 encoded data. Otherwise, i.e., when it is determined that the language environment is not a Latin language, the character container can be initialized to store utf-16 encoded data.

In one embodiment, when the user opens a website that is in Chinese, the mobile browser can determine that the language environment is a non-Latin language, and can accordingly initialize the character container to store utf-16 encoded data.

In another embodiment, when the user opens a website that is in English, the mobile browser can determine that the language environment is English, and can accordingly initialize the character container to store utf-8 encoded data.

In Step S103, requested webpage data are received, the received webpage data are parsed, and merge and store the webpage data using the initialized character container.

For example, text objects themselves in source code of the webpage data are fragmented and separate, i.e. stored using multiple character containers. In this step, the text object originally stored in multiple character containers can be merged and stored using one character container by being placed or connected end to end.

Further, in order to locate the specific location of a text object, an index can be added for the webpage data, such that the text object can be adapted (or matched) from the character container according to the index value.

Figure 2:
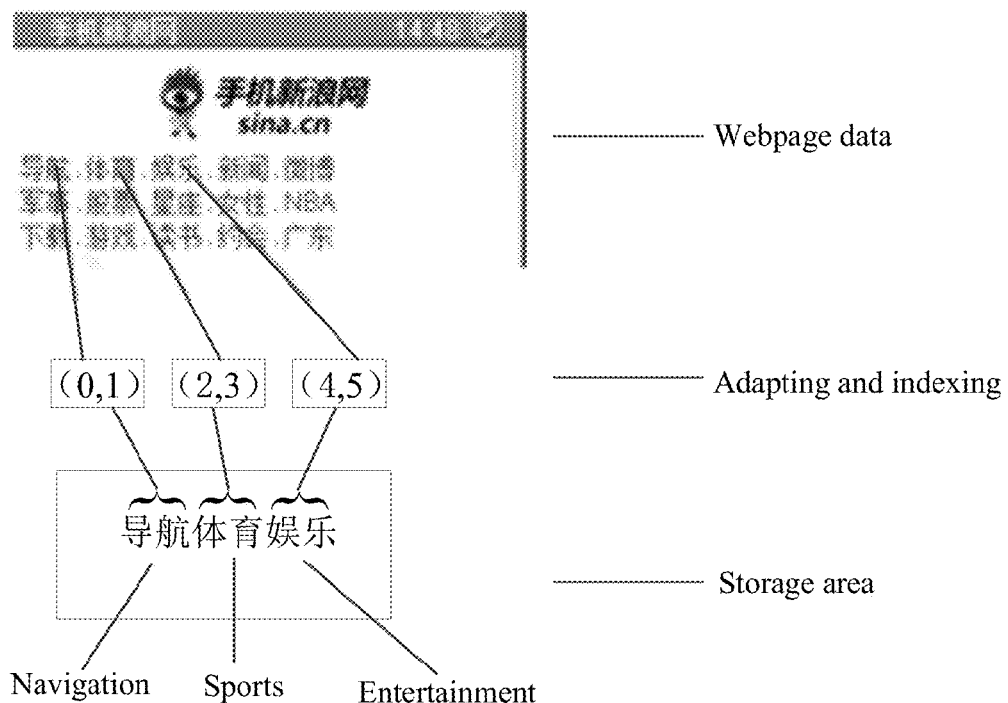
FIG. 2 depicts a schematic of adaptation and optimized storage of a character container in accordance with various disclosed embodiments.

FIG. 2 depicts a schematic of a method for storing webpage data in a character container in accordance with various disclosed embodiments. As shown in FIG. 2, webpage data, e.g., 导航 (i.e., Chinese characters meaning "navigation"), 体育 (i.e., Chinese characters meaning "sports"), 娱乐 (i.e., Chinese characters meaning 'entertainment'), 新闻 (i.e., Chinese characters meaning 'news'), 微博 (i.e., Chinese characters meaning 'microblog'), 军事 (i.e., Chinese characters meaning 'military'), 股票 (i.e., Chinese characters meaning 'stocks') and the like, are displayed to the user via the mobile browser. Such text objects can be merged and stored using one character container in order to reduce the space occupied by the character container itself. After the merging and storing, the stored contents need to be adapted and indexed, such that the stored contents can be normally retrieved when need to be used.

As shown in FIG. 2, text such as "导航", "体育", "娱乐" and the like can be merged and be stored end to end. Corresponding index values can be added. For example, the index values corresponding to "navigation" can be (0,1), the index values corresponding to "sports" can be (2,3), and the index values corresponding to "entertainment" can be (4,5). The two parts of contents, i.e., "Index" and "data content", can be respectively stored in two memory blocks, and a correspondence relationship can be established between the two memory blocks.

By using the method for compressing webpage text provided in various disclosed embodiments, on one hand, one character container can be used for storing webpage data in order to reduce the space occupied by the character container itself. In one example, when the disclosed method for compressing webpage text is not used, the three text objects "导航", "体育", and "娱乐" need to occupy a space of (4+2+2)+(4+2+2)+(4+2+2)=24 bytes. When the disclosed method for compressing webpage text is used, those three text objects can occupy a space of 4+(2+2)+(2+2)+(2+2)=16 bytes. That is, three text objects can save a space of 8 bytes. For webpage data containing a great amount of text contents, the method for compressing webpage text provided in various disclosed embodiments can significantly save storage space.

On the other hand, via such merging, adapting and indexing processes, an upper layer of the program does not have to be concerned about whether a character container in a lower layer specifically uses utf-16 encoding, utf-8 encoding, or certain other encoding for storage. The upper layer just needs to tell the character container to read text (e.g., "导航") having a certain subscript (or index) in an original webpage. Thus, an adaptation layer can find corresponding text from the character container according to the index value (e.g., (0,1)). With such a clear-structure and low-coupling storage method that uses unified management by a merging method, memory consumption can be significantly saved.

According to the technical solutions as described above, compared with existing technology that uses a fixed encoding method for storing a webpage, applying the method for compressing webpage text in accordance with various disclosed embodiments can more effectively utilize the limited memory on mobile devices such as mobile phones, and can improve user experience. The technical effects provided in various embodiments can be seen in the following two implementation examples.

Example One

Previously, when certain low-end mobile phones open a large page (or webpage) using a mobile browser, a problem of incomplete loading can occur. The reason of such a problem is that when memory is insufficient, the browser can give up continuing to load the page content. However, when the disclosed method for compressing webpage text is used, the amount of occupied memory during the loading of the webpage can be significantly reduced. When the amount of occupied memory of the webpage is reduced, the large webpage is accordingly able to be completely loaded.

Example Two

Previously, when certain low-end mobile phones using a mobile browser and try to go back after browsing a few pages, a situation often occurs where re-networking is required. The reason is that, when memory is insufficient, the browser can clean out historical page data cached in the memory. After the historical page(s) are recycled, in order to return to the page (i.e., recycled page), re-networking is needed to obtain data, which can impact the user. However, when the disclosed method for compressing webpage text is used, the amount of occupied memory during the loading of the webpage can be significantly reduced. When the amount of occupied memory of the webpage is reduced, the probability of the user re-networking after clicking to go back can be significantly reduced. User experience can thus be improved.

A program used for implementing the method for compressing webpage text according to various embodiments can be stored on a computer-readable storage medium. Thus, various embodiments further provide a computer-readable storage medium. The computer-readable storage medium can store a program used for implementing the method for compressing webpage text according to various embodiments.

Further, typically, the mobile terminal as described in the present disclosure can include a variety of handheld terminal devices, e.g., mobile phone, personal digital assistant (PDA), and the like, so the scope of the present disclosure is not limited to a particular type of mobile terminal.

Furthermore, the method according to the present disclosure can also be implemented as a computer program executed by a central processing unit (CPU). When the computer program is executed the CPU, the functions defined above in the method of the present disclosure can be executed.

Further, the above method steps and system units can be implemented using a controller and a computer-readable storage device used for storing a computer program that can cause the controller to implement the functions of the above steps or units.

Further, it should be understood that the described computer-readable storage device (e.g., memory) may be volatile memory or non-volatile memory, or may include volatile memory and nonvolatile memory. As a non-limiting example, nonvolatile memory can include read-only memory (ROM), programmable ROM (PROM), electrically programmable ROM (EPROM), electrically erasable programmable ROM (EEPROM), or flash memory. Volatile memory may include random-access memory (RAM) and the RAM may be used as external cache memory. As a non-limiting example, RAM can be produced in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage device includes, but are not limited to, these and other suitable types of memory.

Those skilled in the art understand that the disclosed various exemplary logic blocks, modules, circuits and algorithm steps can be implemented in electronic hardware, computer software or a combination thereof. In order to clearly illustrate the interchangeability between the hardware and the software, the interchangeability has been generally described via the functions of the various exemplary components, blocks, modules, circuits and algorithm steps. Whether the functions are implemented in hardware or software depends on the specific application and the design limitation imposed on the entire system. Those skilled in the art can use a variety of ways to realize the described functionalities for each specific application. However, such realization decision should not be interpreted as departing from the scope of the present invention.

The various illustrative logic blocks, modules, and circuits described herein can be implemented or executed by using the following components designed to execute the disclosed functionalities: general-purpose processor, digital signal processor (DSP), application specific integrated circuit (ASIC), field programmable gate array (FPGA) or other programmable logic device, discrete gate or transistor logic, discrete hardware components, or any combination of these components. The general-purpose processor can include a microprocessor or, alternatively, the processor can include any conventional processor, controller, microcontroller or state machine. The processor can also include a combination of computing devices, such as a combination of DSP and microprocessors, multiple microprocessors, one or more microprocessors integrated with a DSP core, or any other such configurations.

The disclosed methods or algorithm steps may be embodied in hardware directly, in software modules executed by the processor, or in a combination of both. The software modules can reside in RAM memory, flash memory, ROM memory, EPROM memory, EEPROM memory, registers, hard disk, removable disk, CD-ROM, or any other form of storage medium known in the field. The exemplary storage medium can be coupled to the processor, such that the processor can read information from the storage medium or write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

In one or more exemplary designs, the functions as described may be implemented in hardware, software, firmware, or any combination thereof. If implemented in software, the functions can be stored on a computer-readable medium or transmitted via a computer-readable medium as one or more instructions or code. The computer-readable medium can include computer storage medium and communication medium. The communication medium can include any available medium that can help to transmit a computer program from one location to another location. The storage medium can include any usable medium that can be accessed by a general-purpose or special-purpose computer. As a non-limiting example, the computer-readable medium can include RAM, ROM, EEPROM, CD-ROM or other optical disk storage devices, magnetic disk storage devices or other magnetic storage devices, or can include any other medium that can be used for carrying or storing desired program code in the form of instructions or data structures and that can be accessed by a general-purpose or special-purpose computer or a general-purpose or special-purpose processor.

In addition, any connection can be properly referred to as a computer-readable medium. For example, if a coaxial cable, optical fiber cable, twisted pair, digital subscriber line (DSL) or wireless technology such as infrared, radio and microwave is used for sending software from a website, a server, or other remote sources, the above coaxial cable, optical fiber cable, twisted pair, DSL or wireless technology such as infrared, radio and microwave can all be included in the definition of medium. As used herein, magnetic disk and optical disk can include compact disc (CD), laser disc, optical disc, digital versatile disc (DVD), floppy disk and blu-ray disc, where a magnetic disk usually magnetically reproduces data, while an optical disk reproduces data using laser optics. Combinations of the above contents should also be included within the scope of computer-readable media.

While the foregoing disclosure shows illustrative embodiments of the present disclosure, it should be noted that, without departing from the scope of the present disclosure as defined by the claims, various changes and modifications may be implemented. The functions, steps and/or actions of the method claims according to the various embodiments described herein are not required to be executed in any particular order. Furthermore, although an element of the present disclosure can be described or claimed in singular form, a plurality can be envisaged, unless explicitly restricted to be singular.

Corresponding to the above-disclosed method for compressing webpage text, various embodiments of the present disclosure also provide an apparatus for compressing webpage text. It should be noted that the disclosed apparatus for compressing webpage text can be used for implementing the disclosed method for compressing webpage text. The disclosed method for compressing webpage text can also be implemented via the disclosed apparatus for compressing webpage text.

Figure 3:
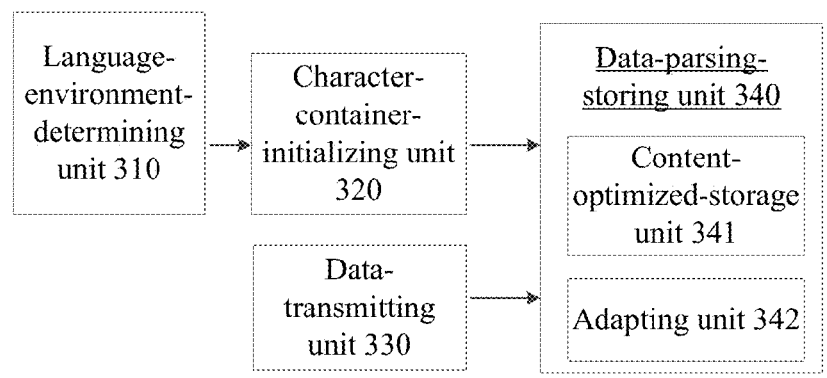
FIG. 3 depicts a block diagram of an exemplary apparatus for compressing webpage text in accordance with various disclosed embodiments.

FIG. 3 depicts a block diagram of an exemplary apparatus for compressing webpage text 300 in accordance with various disclosed embodiments. As shown in FIG. 3, the apparatus for compressing webpage text 300 can include a language-environment-determining unit 310, a character-container-initializing unit 320, a data-transmitting unit 330, and a data-parsing-storing unit 340. The character-container-initializing unit 320 can include a determining unit (not shown).

For example, when, via a mobile browser, a user requests opening a webpage, the language-environment-determining unit 310 can first obtain a current language environment of the terminal according to the webpage-opening request of the mobile terminal browser. According to the language environment determined by the language-environment-determining unit 310, the character-container-initializing unit 320 can then initialize a character container corresponding to the language environment. When the language environment belongs to Latin languages (e.g., English), the character-container-initializing unit 320 can initialize the character container to be a utf-8 character container. When the language environment does not belong to Latin languages (e.g., English), the character-container-initializing unit 320 can initialize the character container to be a utf-16 character container. After the character container of a determined encoding method is initialized, the data-transmitting unit 330 can start to receive webpage data requested by the terminal browser. The data-parsing-storing unit 340 can then parse the received webpage data, and merge and store the webpage data using the corresponding character container.

The character-container-initializing unit 320 can include the determining unit configured to determine whether the language environment belongs to Latin languages. When the language environment belongs to Latin languages, the character-container-initializing unit 320 can initialize the character container to store utf-8 encoded data. When the language environment does not belong to Latin languages, the character-container-initializing unit 320 can initialize the character container to store utf-16 encoded data.

In addition, in order to further reduce memory consumption of webpage storage, the webpage to be stored can be processed by merging, adapting and indexing. For example, the data-parsing-storing unit 340 can include a content-optimized-storage unit 341 and an adapting unit 342. The content-optimized-storage unit 341 can be configured to merge fragmented and separated text objects in webpage source code, and connect the text objects end to end to be stored in the character container. The adapting unit 342 can be configured to add an adapting index for the character container, such that a corresponding text object can be adapted from the character container according to an index value.

Methods and apparatus for compressing webpage text according to various embodiments are described as above via examples and with reference to the accompanying drawings. However, the skilled person in the art understand that, various modifications may be made to the disclosed methods and apparatus for compressing webpage text without departing from contents of the present disclosure.

The above are merely preferred embodiments of the present disclosure, and are not intended to limit the scope of the present disclosure. For a person skilled in the art, the present disclosure can have various modifications and changes. Any modification, equivalent replacement, improvement, etc., made within the spirit and principles of the present disclosure, should all be included within the scope of the present disclosure.

What is claimed is:

1. A method for compressing webpage text, comprising: according to a webpage-opening request of a mobile terminal browser, obtaining a current language environment of a terminal;
   according to the language environment, initializing a character container corresponding to the language environment, wherein:
   the character container is a storage space for storing related webpage data, and is implemented by applying for a "type" in software code to store the webpage data,
   when the language environment belongs to Latin languages, the character container is initialized to store utf-8 encoded data, and
   when the language environment does not belong to Latin languages, the character container is initialized to store utf-16 encoded data; and
   receiving webpage data that are requested, parsing the webpage data, and merging and storing the webpage data by using the corresponding character container, including:
   merging a plurality of text objects in source code of the webpage data that are originally stored in multiple character containers, and storing the merged plurality of text objects in the initialized character container, wherein the merged plurality of text objects are connected end to end, and adding an adapting index for the initialized character container, such that each of the plurality of text object is able to be retrieved in the initialized character container according to a corresponding index value of the adapting index wherein each of the plurality of text object is able to be retrieved in the initialized character container according to a corresponding index value of the adapting index without using the utf-8 encoded data or the utf-16 encoded data.

2. The method according to claim 1, wherein the language environment belonging to Latin languages comprises English, German, or French.

3. The method according to claim 1, wherein during a process of applying for the "type" in software code to store the webpage data, the method further comprises:
   first, applying for an extra space in order to store a head of the type for indicating additional descriptive information; and
   next, applying for an actual space in order to store the webpage data.

4. The method according to claim 1, wherein the character container is implemented by applying for a String type in Java language to store the webpage text.

5. An apparatus for compressing webpage text, comprising one or more processors, memory, and one or more program units stored in the memory and to be executed by the one or more processors, the one or more program units comprising:
   a language-environment-determining unit configured to, according to a webpage-opening request of a mobile terminal browser, obtain a current language environment of a terminal;
   a character-container-initializing unit configured to, according to the language environment, initialize a character container corresponding to the language environment, wherein:
   the character container is a storage space for storing related webpage data, and is implemented by applying for a "type" in software code to store the webpage data,
   when the language environment belongs to Latin languages, the character container is initialized to store utf-8 encoded data, and
   when the language environment does not belong to Latin languages, the character container is initialized to store utf-16 encoded data;
   a data-transmitting unit configured to receive webpage data that are requested; and
   a data-parsing-storing unit configured to parse the received webpage data, and merge and store the webpage data by using the corresponding character container, wherein the data-parsing-storing unit comprises:
   a content-optimized-storage unit configured to merge a plurality of text objects in source code of the webpage data that are originally stored in multiple character containers, and storing the merged plurality of text objects in the initialized character container, wherein the merged plurality of text objects are connected end to end, and
   an adapting unit configured to add an adapting index for the initialized character container, such that each of the plurality of text object is able to be retrieved in the initialized character container according to a corresponding index value of the adapting index wherein each of the plurality of text object is able to be retrieved in the initialized character container according to a corresponding index value of the adapting index without using the utf-8 encoded data or the utf-16 encoded data.

6. The apparatus according to claim 5, wherein, during a process of applying for the "type" in software code to store the webpage data:
   an extra space is applied for first, in order to store a head of the type for indicating additional descriptive information; and
   an actual space is applied for next, in order to store the webpage data.

7. The apparatus according to claim 5, wherein the language environment belonging to Latin languages comprises English, German, or French.

8. The apparatus according to claim 5, wherein the character container is implemented by applying for a String type in Java language to store the webpage text.

9. A non-transitory computer-readable storage medium having a program stored thereon, the program being executed by a processor, wherein, when executed by the processor, the program causes the processor to perform a process for compressing webpage text, the process comprising:
   according to a webpage-opening request of a mobile terminal browser, obtaining a current language environment of a terminal;
   according to the language environment, initializing a character container corresponding to the language environment, wherein:
   the character container is a storage space for storing related webpage data, and is implemented by applying for a "type" in software code to store the webpage data,
   when the language environment belongs to Latin languages, the character container is initialized to store utf-8 encoded data, and
   when the language environment does not belong to Latin languages, the character container is initialized to store utf-16 encoded data; and
   receiving webpage data that are requested, parsing the webpage data, and merging and storing the webpage data by using the corresponding character container, including:
   merging a plurality of text objects in source code of the webpage data that are originally stored in multiple character containers, and storing the merged plurality of text objects in the initialized character container, wherein the merged plurality of text objects are connected end to end, and
   adding an adapting index for the initialized character container, such that each of the plurality of text object is able to be retrieved in the initialized character container according to a corresponding index value of the adapting index wherein each of the plurality of text object is able to be retrieved in the initialized character container according to a corresponding index value of the adapting index without using the utf-8 encoded data or the utf-16 encoded data.

10. The non-transitory computer-readable storage medium according to claim 9, wherein the language environment belonging to Latin languages comprises English, German, or French.

11. The non-transitory computer-readable storage medium according to claim 9, wherein the program further causes the processor the process comprising:
> during a process of applying for the "type" in software code to store the webpage data,
> first, applying for an extra space in order to store a head of the type for indicating additional descriptive information; and
> next, applying for an actual space in order to store the webpage data.

12. The non-transitory computer-readable storage medium according to claim 9, wherein the character container is implemented by applying for a String type in Java language to store the webpage text.

* * * * *